Figure 1:
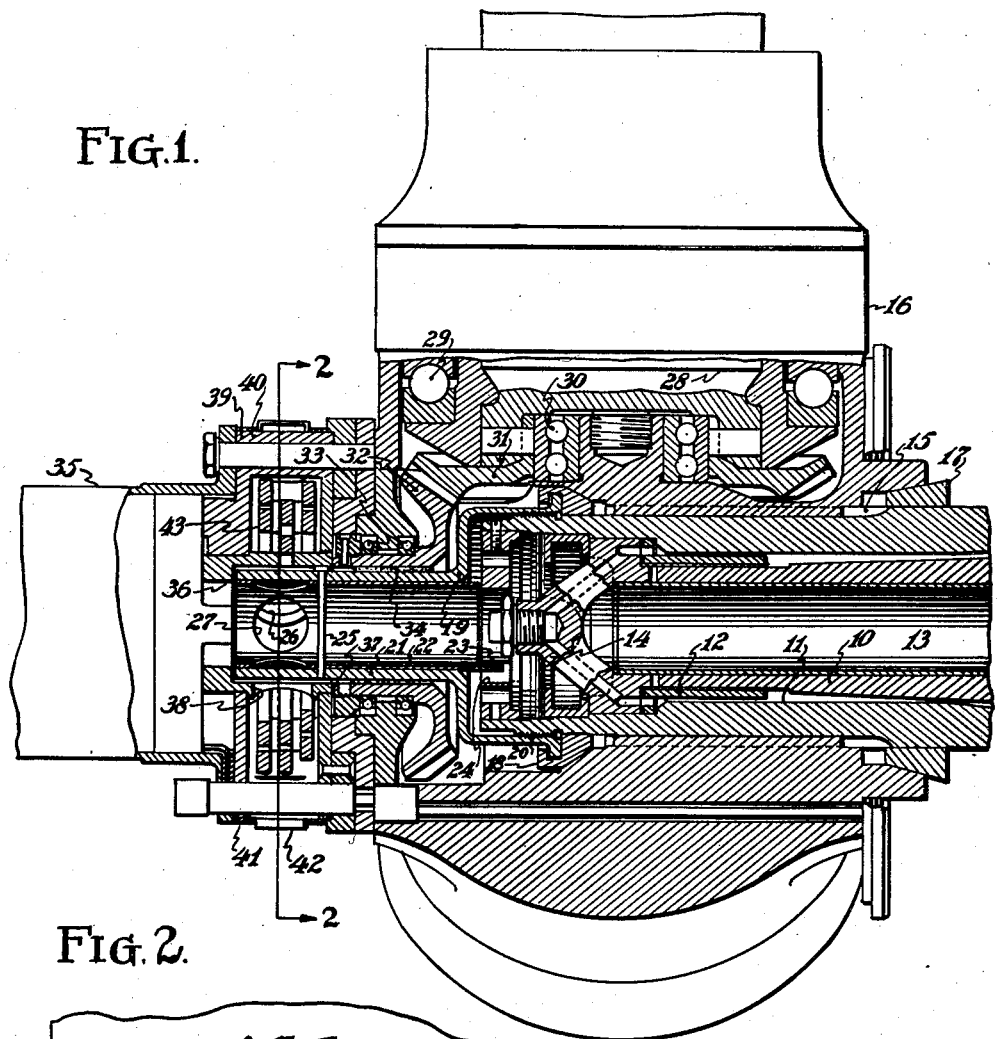

March 3, 1936.  W. J. BLANCHARD  2,032,682
CRANKCASE VENT
Filed Nov. 21, 1934

INVENTOR.
WERNER J. BLANCHARD.
BY
ATTORNEY.

Patented Mar. 3, 1936

2,032,682

UNITED STATES PATENT OFFICE 2,032,682

CRANKCASE VENT

Werner J. Blanchard, Kenmore, N. Y., assignor to Curtiss Aeroplane & Motor Company, Inc., a corporation of New York Application November 21, 1934, Serial No. 754,192

9 Claims. (Cl. 170—172)

This invention relates to aircraft power plants, and is particularly concerned with improvements in means for venting the crankcase of an aircraft engine equipped with a controllable pitch propeller.

The particular embodiment of the invention which I have chosen for illustration is used in connection with an aircraft engine having a hollow propeller shaft, the hollow of which is adapted to serve as a breather opening between the atmosphere and the interior of the engine casing. Engine shafts of this character, which are well known in the art, have previously been provided with propellers of the fixed pitch type wherein the engine propeller shaft extends through the hub of the propeller and is open at its forward end to the atmosphere. Certain propellers of the controllable pitch type are provided with apparatus at the front of the propeller and coincidental with the propeller shaft axis, which closes the breather opening when used on engines of the type mentioned. Thus, it is necessary to provide radial openings through the front of the propeller hub to permit the hollow propeller shaft to function as a breather. Initial constructions of this character were found to be faulty, in that the gases breathed through the engine tended to enter the mechanism within the hub of the controllable pitch propeller. As the gases exuding from the crankcase breather contain products of combustion from the internal combustion engine cylinders in which are water vapor and certain obnoxious gases, condensation of moisture within the propeller hub mechanism could condense and freeze in cold weather, and the water likewise could absorb certain of the obnoxious gases to make a solution having a corrosive effect upon the metals in the hub mechanism. To overcome the above conditions, the subject invention was perfected, and in conjunction therewith, means are provided to assist in balancing the loads upon the prime mover which effects increments and decrements in propeller pitch.

An object of the invention is to provide an improved crankcase breathing organization for an internal combustion engine.

A further object is to provide apparatus tending to withdraw vapors from the interior of an engine crankcase.

A further object is to provide means to prevent the seepage of crankcase vapors within the operating mechanism of a controllable pitch propeller carried by the engine.

Still another object is to provide an improved breathing system for an aircraft power plant, the power plant including an internal combustion engine and a controllable pitch propeller.

Still another object is to provide resilient means in connection with the propeller hub mechanism tending to bias the pitch of the propeller blades toward one extreme of adjustment, to counteract air loads upon the propeller blades which tend to turn the blades toward the other extreme of adjustment. Thereby, the load upon the motor, or its equivalent which effects pitch changes of the propeller, is substantially equalized whether the propeller pitch be increased or decreased.

Figure 2:
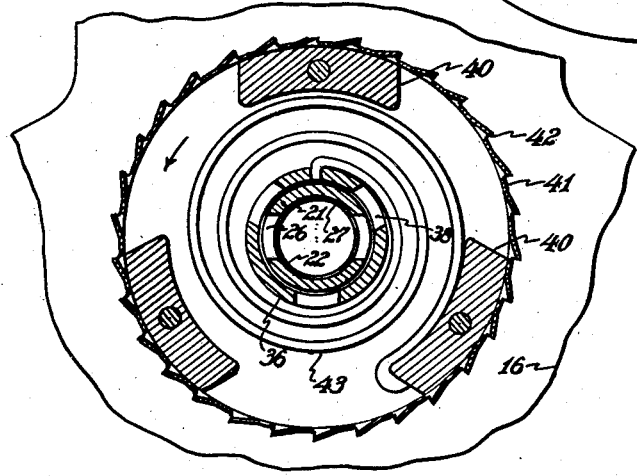

For a more detailed understanding of the invention and its more specific objects, reference may be made to the annexed specification and claims, and to the drawing, in which:

Fig. 1 is a fragmentary axial section through the hub of a controllable pitch propeller as mounted upon the propeller shaft of an engine; and Fig. 2 is a section on the line 2—2 of Fig. 1.

In Fig. 1, 10 represents the crankshaft of an internal combustion engine of the geared type, wherein a propeller shaft 11 is mounted coaxially with the crankshaft and is guided thereon. It will be understood that suitable gearing within the engine casing is provided for effecting speed ratio changes between the crankshaft and the propeller shaft in a manner well known in the art. The guiding of the propeller shaft 11 with respect to the crankshaft 10 is assisted by means of the bearing 12 therebetween. It will be noted that the crankshaft 10 is hollow, the bore 13 thereof communicating with the interior of the engine casing and being open at its forward end. The propeller shaft 11 is likewise open at its forward end and is provided with a screen 14 to prevent the passage of dust and solid matter into the interior of the engine. The external surfaces of the propeller shaft are provided with splines 15 upon which a propeller hub 16 is mounted, the rearward end of the hub bearing on a tapered ring 17, and the forward end thereof being mounted in conventional manner upon a tapered split ring 18. The ring 18 is held in place by a propeller hub nut 19 bearing thereagainst, said nut having threaded engagement as at 20 with the forward end of the propeller shaft. The nut 19 just forward of the end of the propeller shaft 11 is necked inwardly to a smaller diameter portion 21, the bore diameter of which is substantially the same as the diameter of the bore 13 in the crankshaft. A sleeve 22 is adapted to slide within the nut portion 21, said sleeve having a projection 23 which engages within a notch 24 formed at the front end of the propeller shaft. By inserting the sleeve 22 and by then inserting a pin 25 through both the nut portion 21 and the sleeve, the propeller hub nut 19 is positively locked in place. The front end of the nut portion 21 is provided with radial openings 26, while the sleeve 22 is provided with a plurality of similar openings 27. These openings are so arranged that regardless of the relative circumferential position of the sleeve 22 with respect to the nut 19, certain of the openings 26 and 27 will always register to permit of breathing of crankcase vapors therethrough.

The controllable pitch propeller of which the hub 16 is a part, includes blades 28 axially rotatable within the hub and borne therein by a thrust bearing 29 and a double pilot bearing 30. The root of each blade 28 has fixed thereto a bevel gear 31 meshing with a bevel gear 32, the axis of which is coaxial with the crankshaft axis. This gear is borne in the hub 16 by bearings 33, the hub of the gear 32 being hollow and encircling the propeller hub nut portion 21 in spaced relation. Between the bore of the gear hub and the outside of the hub nut portion 21, a lubricated packing 34 is inserted, this packing serving to prevent the flow of any crankcase vapors from the openings 26 and 27 rearwardly into the propeller hub. As indicated previously, the flow of any gases within the hub may cause corrosion and freezing difficulties tending to impair the effective operation of the controllable pitch propeller. In previous constructions, the propeller hub nut 19 was not extended forwardly and packed with respect to the propeller hub, whereby crankcase gases could readily have access to the interior of the hub.

Means for operating the controllable pitch propeller includes a motor and speed reduction unit 35 of any suitable type, one suitable for the purpose being shown in my Patent Number 1,951,320. The rotatable shaft of the unit 35 is indicated at 36 and comprises a cylindrical sleeve surrounding the forward portion of the hub nut 19 and having a driving connection at 37 with the hub of the gear 32. As this sleeve 36 embraces the front end of the hub nut, radial openings 38 are formed therein in the same plane as the openings 26 and 27. Thus, crankcase gases may pass inwardly or outwardly through the sleeve as well as through the propeller hub nut. A casing 39 serves to space the driving unit 35 from the propeller hub 16, and this casing is formed with circumferentially spaced elements 40 whereby substantial open sectors are left between the elements 40 for the passage of crankcase gases. These elements 40 are encircled by a band 41 having louvres 42 formed throughout its periphery. These louvres open in a direction opposite to the direction of rotation of the propeller, as shown in Fig. 2 wherein it is assumed that the propeller rotates in a counter-clockwise direction as viewed. It will thus be apparent that when the propeller is rotating rapidly, the louvres tend to set up a slight suction by which crankcase vapors are drawn outwardly to the atmosphere. Thus, such vapors are directly dissipated and atomized to the end that they may not cause any difficulty in the propeller mechanism.

An added feature of my propeller construction lies in a plurality of spiral springs 43, each having its inner end engaging within a suitable notch in the sleeve 36 and having its outer end hooking around one of the elements 40. As shown, three springs 43 are utilized and the ends of the springs may each bear against a separate one of the elements 40 to equalize their torsional load distribution. These springs are set in initial tension and tend to urge the sleeve 36 in a clockwise direction with respect to the hub 16 and elements attached thereto, when viewed from the front. In the construction shown, clockwise rotation of the sleeve 36 operates to increase the pitch of the propeller blades. The propeller blades are constantly urged toward a low pitch position by the action of the air forces thereon. With this characteristic, common to all conventional propellers, it will be seen that the effort necessary to increase propeller pitch by some motive means will be greater than the effort required to reduce the pitch. Thus, the springs tend to counteract a major part of the aerodynamic pitch reducing force, so that the operating unit 35 need only overcome the other various forces and will require substantially the same torque to either increase or decrease propeller pitch.

I have organized the various elements in the embodiment shown so that there is a minimum of complication in taking care of both the crankcase breathing and the balancing of the pitch changing forces. The springs 43 which are not a part of a complex mechanism involving bearing surfaces and the like, may readily be placed within the path of the crankcase vapors without harm thereto, by which expedient the hub and pitch changing assembly is made compact and clean in appearance.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim:

1. In an aircraft power plant including a hollow propeller shaft the hollow of which forms a vent for the engine of the power plant and a controllable pitch propeller mounted on said shaft, means for operating the pitch controlling mechanism of said propeller mounted ahead of and concentric with said propeller shaft, and a hollow shaft connecting said operating means with said propeller, embracing a portion of said propeller shaft, both said hollow shafts having radial openings therein for establishing communication between the atmosphere and the shaft hollows.

2. In an aircraft power plant including a hollow propeller shaft the hollow of which forms a vent for the engine of the power plant and a controllable pitch propeller mounted on said shaft, means for operating the pitch controlling mechanism of said propeller mounted ahead of and concentric with said propeller shaft, and a hollow shaft connecting said operating means with said propeller, embracing a portion of said propeller shaft, both said hollow shafts having radial openings therein for establishing communication between the atmosphere and the shaft hollows, said radial openings being intermediate said propeller and said operating means.

3. In an aircraft power plant including a hollow propeller shaft the hollow of which forms a vent for the engine of the power plant and a controllable pitch propeller mounted on said shaft, means for operating the pitch controlling mechanism of said propeller mounted ahead of and concentric with said propeller shaft, a hollow shaft connecting said operating means with said propeller, embracing a portion of said propeller shaft, both said hollow shafts having radial openings therein for establishing communication between the atmosphere and the shaft hollows, said radial openings being intermediate said propeller and said operating means, and a louvered band carried by said propeller in the axial plane of said openings.

4. In an aircraft power plant including a controllable pitch propeller mounted on a hollow engine propeller shaft, the hollow of said shaft serving as a crankcase breather, means for controlling the propeller pitch concentric with and axially spaced ahead of said shaft, and means intermediate said shaft and said controlling means for establishing communication between the outside air and the hollow of said shaft.

5. In an aircraft power plant including a controllable pitch propeller mounted on a hollow engine propeller shaft, the hollow of said shaft serving as a crankcase breather, means for controlling the propeller pitch concentric with and axially spaced ahead of said shaft, and means intermediate said shaft and said controlling means for establishing communication between the outside air and the hollow of said shaft, said means including a louvered band having louvres opening counter to the direction of propeller rotation.

6. In a power plant including a controllable pitch propeller mounted on a hollow engine propeller shaft, the hollow of said shaft serving as a crankcase breather for said engine, means for preventing entry of breathed gases within the hub of said propeller comprising a seal between the propeller hub and said shaft and a louvered band mounted on said hub, the band louvres establishing communication between the atmosphere and the hollow of said shaft.

7. In a power plant including a controllable pitch propeller mounted on a hollow engine propeller shaft, the hollow of said shaft serving as a crankcase breather for said engine, means for preventing entry of breathed gases within the hub of said propeller comprising a seal between the propeller hub and said shaft and a louvered band mounted on said hub, the band louvres establishing communication between the atmosphere and the hollow of said shaft, said louvres being faced counter to the direction of propeller rotation.

8. In combination with a hollow engine shaft, a propeller hub mounted thereon, blades adjustable for pitch change during operation and borne in said hub, pitch changing means mounted concentric with and ahead of said hub and shaft, and a hollow driving connection from said means to said blades embracing a portion of said hollow shaft, said connection having substantially radial openings therein for establishing communication between the hollow of said shaft and the outside atmosphere.

9. In combination with a hollow engine shaft, a propeller hub mounted thereon, blades adjustable for pitch change during operation and borne in said hub, pitch changing means mounted concentric with and ahead of said hub and shaft, and a hollow driving connection from said means to said blades embracing a portion of said hollow shaft, said connection having substantially radial openings therein for establishing communication between the hollow of said shaft and the outside atmosphere, said openings lying between said hub and said pitch changing means.

WERNER J. BLANCHARD.